Dec. 23, 1969     C. STAEHLE     3,485,138
APPARATUS FOR CLEANING MACHINE TOOL WAYS
Filed Oct. 16, 1967
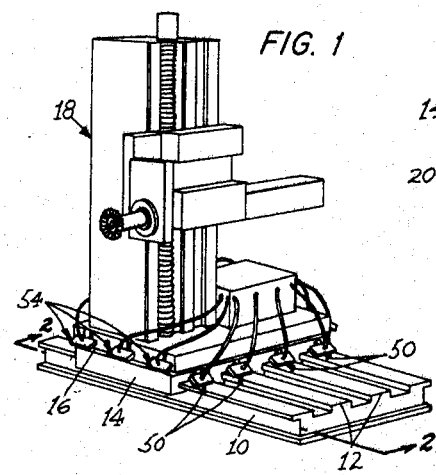
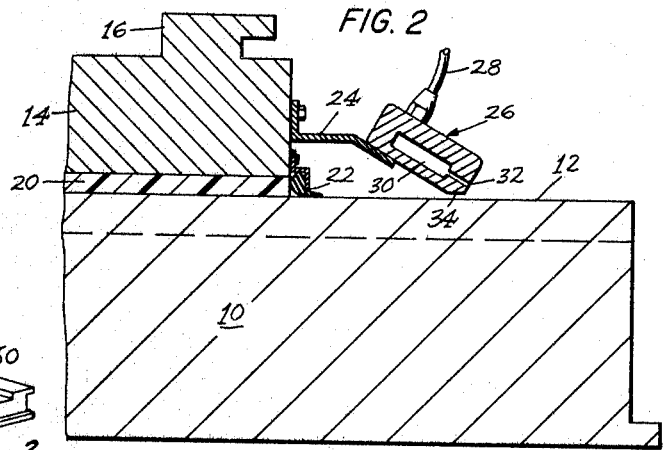
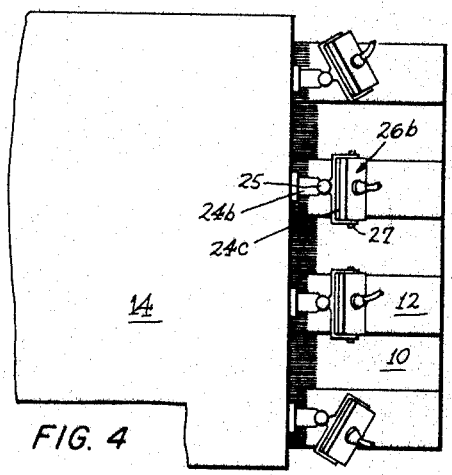
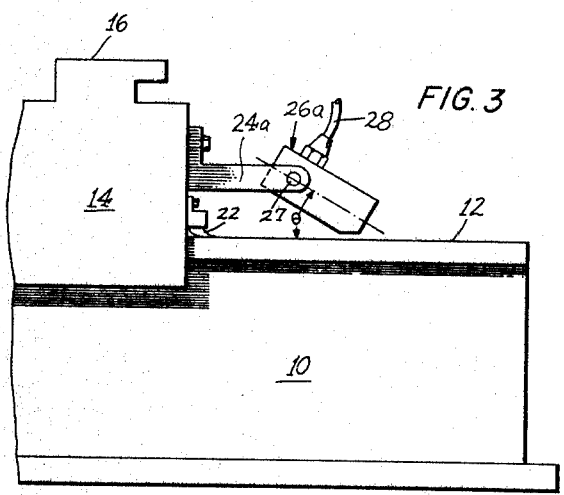
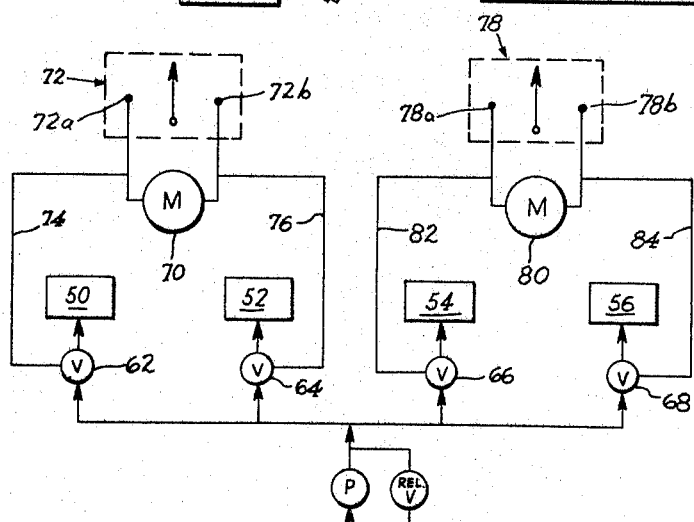
INVENTOR/S
CARL STAEHLE,
BY *Melville, Strasser, Foster and Hoffman*
ATTORNEYS

United States Patent Office 3,485,138
Patented Dec. 23, 1969

3,485,138
APPARATUS FOR CLEANING MACHINE TOOL WAYS
Carl Staehle, Cincinnati, Ohio, assignor to The G. A. Gray Company, Cincinnati, Ohio, a corporation of Ohio
Filed Oct. 16, 1967, Ser. No. 675,458
Int. Cl. B23c 7/00, 9/00
U.S. Cl. 90—11                                   6 Claims

ABSTRACT OF THE DISCLOSURE

Fluid jet wiper secured to a movable component of a machine tool for cleaning the ways upon which the component is movable.

BACKGROUND OF THE INVENTION

This invention relates generally to an apparatus for removing chips and other debris from the exposed horizontal ways of a machine tool. This invention finds great and particularly utility in connection with the large horizontal boring, drilling and milling machines and the like wherein a column carrying a cutting tool is movable relatively great distances along two perpendicularly arranged sets of guiding ways.

As is well known in the art, such a machine includes a runway secured to the foundation where the machine is located. This runway includes a plurality of longitudinal ways, upon which is slidable a saddle. The saddle in turn has a plurality of ways arranged perpendicularly to the ways of the runway, and upon which the tool column is slidable. The exposed or upper surface of the various ways is generally of metal, and in many cases may be hardened to as much as 70 Rockwell "C." The mating surface of the slidable component will be faced with a relatively soft material to provide a bearing surface. Typical bearing materials include Babbitt, Formica, bronze, Teflon, and the like. Chips or other debris, resulting from the action of the cutting tool, from people walking across the ways and other sources will distribute themselves over the exposed ways, and tend to be forced into the bearing material during movement of the machine components along the ways. Various types of wipers, brushes, magnets and other devices have been tried without complete success, to prevent entry of chips and dirt into the bearing area.

In addition, many people have come up with ingenious movable cover designs intended to cover the normally exposed portions of the ways to protect them from falling chips and debris. Since, in machines of the general type under consideration, such covers must be substantial enough to support personnel, it is exceedingly difficult to make them dirt tight. Experience has shown that fine dust and flaky chips find their way inside almost any cover which can be designed.

SUMMARY

This invention is directed to the provision of a fluid jet wiper which will be secured to the movable component of a machine tool, and arranged to provide a wiping fluid jet to effectively clean an exposed way during movement of that component in a given direction.

Bearing in mind the problems of the prior art set out above, it is an object of the present invention to provide a positive means for removing chips and debris from the ways of a machine tool.

More specifically, it is an object of this invention to accomplish this chip removal by means of a positive fluid jet.

Still more specifically, it is an object of this invention to provide a fluid jet which is adjustable so as to achieve the desired wiping action under a wide variety of circumstances and conditions.

Still another object of the invention is to provide such a fluid jet wiper which is actuated only when a given machine component begins to move along its ways, thereby minimizing consumption of fluid.

BRIEF DESCRIPTION OF THE DRAWINGS

FIGURE 1 is a perspective view showing a horizontal boring, drilling and milling machine to which this invention can be advantageously applied.

FIGURE 2 is a partial cross sectional view along the line 2—2 of FIGURE 1.

FIGURE 3 is a side elevational view of the components shown in FIGURE 2.

FIGURE 4 is a partial top plan view showing the arrangement of a plurality of jet wipers according to this invention.

FIGURE 5 is a schematic showing of a suitable control system.

DESCRIPTION OF THE PREFERRED EMBODIMENT

FIGURE 1 shows in perspective a large horizontal boring, drilling and miling machine to which the jet nozzles of this invention have been applied. Generally considered, this machine includes a runway 10 resting upon a reinforced concrete foundation. This runway is provided with a plurality of parallel ways indicated at 12. Slidable upon these ways is the saddle 14, which in turn is provided with the ways 16 arranged perpendicular to the ways 12, and upon which is slidable the vertical column indicated generally at 18.

Turning now to FIGURE 2, the runway 10 and way 12 are seen in cross section. In most applications of this type, the surface at least of the way 12 will be hardened to as much as 70 Rockwell "C." The portion of the saddle 14 which overlies and slides upon the runway 12 will be provided with a relatively soft bearing material as indicated at 20. As is well known in the art, this material should be selected to be compatible with the hardened way surface. Typical bearing materials would be bronze, Babbitt, laminated thermo-setting resins such as Formica, and TFE fluorocarbon resins like Teflon.

As seen in FIGURE 2, the right hand edge of the saddle 14 is provided with the standard flexible wiper 22. This construction is generally well known in the art, and simply comprises a flexible material which is secured by a suitable bracket to the saddle, and is in flexing contact with the surface of way 12.

Also secured to the right hand edge of the saddle 14 is the bracket 24, which mounts the nozzle indicated generally at 26. As will be seen in FIGURE 4, the nozzle head 26 should be substantially the width of the top surface of the way 12. The nozzle is provided with an opening to receive the conduit 28 which is in communication with a supply of fluid under pressure.

In the embodiment shown, the interior of the nozzle includes the plenum chamber 30, and the elongate narrow discharge slot 32. By virtue of this construction, the nozzle 26 is effective to direct a thin, flat stream of fluid under pressure downwardly at the way surface.

FIGURE 3 shows a slightly modified version of the structure shown in FIGURE 2. In this figure, the bracket 24a mounts the nozzle 26a in such a manner as to permit tilting motion about the horizontal axis 27. Thus, it is possible to vary angle ⊖ indicated on the drawing which represents the angle of impingement of the jet fluid on the way surface.

FIGURE 4 shows in tap plan view still another mounting modification of the fluid jet nozzle of this invention. In this embodiment, the mounting bracket includes the portion 24b which is secured to the saddle 14, and the portion 24c which is pivotally joined to the portion 24b as at 25, so as to change the direction of the jet. In other words, by arranging the fluid jet stream angularly with respect to the longitudinal axis of the way, the chips and/or debris will be encouraged to leave the way surface on a particular side. It will also be apparent that in this embodiment, the nozzle 26a is pivotally secured as at 27 to the bracket portion 24c.

Returning now to FIGURE 2, it will be observed that the nozzle 26 is generally rectangular in cross section, except that one corner is beveled off as indicated at 34. Thus, while the exterior configuration of the nozzle is not critical to this invention, it is desirable to place the point of discharge of the fluid jet as close as possible to the surface of the way 12. Thus, once an optimum angle of jet stream impingement has been determined, (angle ⊖) the included angle of the lower lip of the nozzle should substantially equal angle ⊖.

It will be apparent from the foregoing description that the object of the invention will be accomplished so long as the appropriate fluid jet nozzle is operative to clear debris, chips and the like from the portion of the ways toward which the saddle is moving. Thus, only those nozzles on the leading edge of the saddle need be operative. Furthermore, at such time as the saddle is at rest, none of the nozzles need to be operative.

The means for moving the saddle along the ways, and for moving the column across the ways on the saddle do not form a part of this invention and will not be described in detail. For present purposes, it is sufficient to understand that the machine will be arranged so that by actuating a series of controls, the operator can cause the saddle and column to move in the desired direction.

A suitable control system is schematically illustrated in FIGURE 5. The boxes 50, 52, 54, and 56 each represent a group of fluid jet nozzles disposed respectively on the front and rear of the saddle 14, and on the left and right edges of the column 18. It will of course be understood that each of these groups includes one fluid jet nozzle for each way. Fluid under pressure is supplied to these groups of nozzles from the reservoir 58 via the pump 60, and is controlled respectively by the valves 62, 64, 66, and 68.

Movement of the saddle 14 along the runway 10 may be accomplished for example by a reversible motor indicated schematically at 70. This motor is controlled by the double throw switch indicated generally at 72. Thus, when the switch is moved to the left to contact 72a, the motor 70 is effective to cause the saddle 14 to move in a forward direction along the runway. It will also be observed that actuation of this control by the connection 74 is effective to open the valve 62, thereby permitting fluid under pressure to flow to the jet nozzles 50, clearing the ways in advance of the motion of the saddle. Similarly, movement of the switch to the point 72b causes the motor to drive the saddle in a rearwardly direction, and is effective by the connection 76 to open the valve 64, operating the jet nozzles 52.

Operation of the switch 78 is substantially the same. That is, moving the switch to the point 78a causes the motor 80 to move the column to the left, and is effective via the connection 82 to open the valve 66, thereby operating the nozzles 54, while moving the switch to the point 78b is effective through the connection 84 to open the valve 68 and activate the nozzle 56. Thus, the nozzle system of this invention is integrated with the motion controls of the machine, such that only the jet nozzles on the leading side of the moving component of the machine are in operation.

It is believed that the foregoing constitutes a full and complete disclosure of this invention. No limitations are to be inferred or implied except insofar as specifically set forth in the claims which follow.

The embodiments of the invention in which an exclusive property or privilege is claimed are defined as follows:

1. In a machine tool having a component reciprocably movable along parallel ways, the improved apparatus for removing debris from said ways comprising:
   (a) two jet nozzles for each of said parallel ways;
   (b) means securing said nozzles respectively to opposite sides of said component, said nozzles being axially aligned with said way and having means to direct a thin, flat, jet of fluid under pressure downwardly thereon;
   (c) a supply of fluid under pressure;
   (d) conduit means providing communication between said nozzles and said supply; and
   (e) means for controlling the flow of fluid to each said nozzle, said means being selectively actuated by movement of said component, whereby the nozzle on the leading edge of said component is effective to clean debris in the path of said component, from said way.

2. The apparatus claimed in claim 1 wherein said means securing said nozzles to said component includes a bracket, said nozzle being mounted in said bracket for tilting about a horizontal axis, whereby the angle of impingement of said fluid jet stream upon said way may be varied.

3. the apparatus claimed in claim 1 wherein said means securing said nozzle to said component includes a bracket, said nozzle being pivotal in said bracket about a vertical axis whereby said fluid jet stream may be adjusted angularly with respect to the longitudinal axis of said way to encourage debris to leave either side of the way surface.

4. In a machine tool having a component movable along ways in a first direction of travel and in a second direction of travel opposite to said first direction, the improved apparatus for removing debris from said ways comprising:
   (a) a supply of fluid under pressure;
   (b) at least one fluid jet nozzle secured to said component so as to direct a thin, flat jet of said fluid under pressure onto at least a portion of said ways adjacent the leading side of said component during movement thereof in said first direction of travel, whereby to flush debris from said ways in advance of said component;
   (c) conduit means providing communication between said supply of fluid under pressure and said nozzle; and
   (d) means for controlling said supply of fluid under pressure to said nozzle, said means being responsive to movement of said component in said first direction of travel, whereby said fluid is supplied to said nozzle only during movement of the component in said first direction of travel.

5. The apparatus claimed in claim 4 wherein said nozzle is tiltable about a horizontal axis whereby the angle of impingement of said jet of fluid upon said ways may be varied.

6. The apparatus claimed in claim 4 wherein said nozzle is angularly adjustable with respect to the longitudinal axis of said ways, whereby to encourage debris to leave either side of the way surface.

References Cited

UNITED STATES PATENTS

| | | | |
|---|---|---|---|
| 1,913,975 | 6/1933 | Coe | 90—11 X |
| 2,652,737 | 9/1953 | Longstreet | 308—3.5 X |
| 3,030,692 | 4/1962 | Raynes | 308—3.5 |

ANDREW R. JUHASZ, Primary Examiner

G. WEIDENFELD, Assistant Examiner

U.S. Cl. X.R.

308—3.5, 5